United States Patent [19]
Watson

[11] Patent Number: 5,887,375
[45] Date of Patent: Mar. 30, 1999

[54] CAMERA MOUNT FOR FIREARMS

[76] Inventor: Jerry Wade Watson, P.O. Box 324, Foxworth, Miss. 39483

[21] Appl. No.: 974,140

[22] Filed: Nov. 19, 1997

[51] Int. Cl.$^6$ .................................................. F41C 27/00
[52] U.S. Cl. ............................... 42/106; 42/100; 42/101; 42/103
[58] Field of Search .............................. 42/106, 100, 101, 42/103

[56] References Cited

U.S. PATENT DOCUMENTS

| | | | |
|---|---|---|---|
| 3,545,356 | 12/1970 | Nielsen | 95/12 |
| 3,834,052 | 9/1974 | Steck, III | 42/1 S |
| 3,911,451 | 10/1975 | Vockenhuber | 354/79 |
| 4,309,095 | 1/1982 | Buckley | 354/81 |
| 4,367,606 | 1/1983 | Bechtel | 42/1 ST |
| 4,509,282 | 4/1985 | McMillon | 42/1 ST |
| 4,835,621 | 5/1989 | Black | 358/335 |
| 5,020,262 | 6/1991 | Pena | 42/106 |
| 5,685,636 | 11/1997 | German | 362/259 |

Primary Examiner—Charles T. Jordan
Assistant Examiner—Meena Chelliah
Attorney, Agent, or Firm—Warner J. DeLaune

[57] ABSTRACT

A camera mount for firearms is provided, comprising a base plate; an intermediate plate operatively attached to the base plate; a dampening material, operatively attached between the base plate and the intermediate plate, for dampening recoil forces transmitted to the intermediate plate; and a mounting plate removably attached to the intermediate plate, the mounting plate including a camera attachment device for allowing attachment of a camera to the mounting plate; and an adjustment mechanism, operatively connected between the intermediate plate and the mounting plate, for allowing the camera to be aligned with respect to the firearm. The camera mount further includes a firearm mounting device, operatively attached to the base plate, for mounting the camera mount to the firearm. In one embodiment, the firearm mounting device includes at least one scope mounting bracket shaped and dimensioned to allow attachment of the camera mount to a scope on the firearm. In an alternate embodiment, the firearm mounting device includes a fore-stock mounting bracket shaped and dimensioned to allow attachment of the camera mount to the forestock on the firearm.

8 Claims, 7 Drawing Sheets

CAMERA MOUNT FOR FIREARMS

BACKGROUND OF THE INVENTION

I. Field of the Invention

The present invention relates generally to devices for mounting cameras and video recording equipment, and more particularly to such devices which may be attached to firearms, such as rifles and shotguns.

II. Description of Prior Art

In the sport of hunting, there is often a desire to record the hunt on film, such as through the use of a conventional camera or a video recording device. While many persons bring cameras or video recorders with them on the hunt, they must switch between using the camera and taking shots with the gun. Under these circumstances, it is impossible to record the actual shooting of the animal, unless another person is present to use the camera while the hunter makes the shot. In many instances, however, the hunting environment is not suited to accommodating more than one person. For example, many hunters prefer to hunt alone, if for no other reason than a single person makes less noise than two. Also, when hunters use tree stands, there is seldom any more space for more than one person.

In an effort to provide a solution to the problems discussed above, there have been a number of devices which attempt to combine cameras with firearms. For example, U.S. Pat. No. 4,309,095 to Buckley discloses a camera mounting device which enables the attachment of a camera to the scope of a rifle. A cable and shutter trigger are provided near the rifle trigger in order to coordinate camera activation and the shooting of the rifle. U.S. Pat. No. 4,835,621 to Black discloses a gun mounted video camera comprising a video camera incorporated into a gun-like structure, wherein the pulling of the trigger activates the video camera. Its primary use is to enable spectators at shooting competitions to see the shooters perspective during and after making a shot. U.S. Pat. No. 5,020,262 issued to Pena discloses a camera mount for rifle scopes which includes an optical train connected to the rifle scope for interfacing with the camera. A cable is also provided so that the firing of the rifle simultaneously opens the shutter of the camera for taking the picture.

Although each of the foregoing devices has its advantages, none of those inventions incorporates: (1) an adjustable means for aligning the line of sight of the camera with the firing line of the firearm, and (2) a dampening system incorporated into the mount to protect the sensitive electronic and optical components of the camera. While it is possible for the present invention to work with single lens reflex cameras and other single frame photographic equipment, it is primarily intended for use with video recording devices, such as conventional camcorders. For this reason, there is less of a need for coordinating activation of the camera with the firing of the firearm. Therefore, the present invention benefits from being simpler than other devices, because it includes only those features which are most important in successfully capturing the moments immediately before, during and after a shot is fired.

SUMMARY OF THE INVENTION

It is therefore an object of this invention to provide a camera mount for firearms that supports any conventional video recording device.

It is also an object of this invention to provide a camera mount for firearms that allows mounting of the camera to either an existing scope or the forestock of the firearm.

It is a further object of this invention to provide a camera mount for firearms that provides greater protection to the camera by incorporating a dampening system for reducing the shock and vibration from the recoil of the firearm.

Yet another object of this invention is to provide a camera mount for firearms that allows quick and easy adjustment of the line of sight of the camera to suit the needs of the hunter and accommodate changes in zoom depth of the camera.

Still another object of this invention is to provide a camera mount for firearms that is lightweight and durable under harsh operating conditions.

These and other objects and advantages of the present invention will no doubt become apparent to those skilled in the art after having read the following description of the preferred embodiment which are contained in and illustrated by the various drawing figures.

Therefore, in a preferred embodiment, a camera mount for firearms is provided, comprising a base plate; an intermediate plate operatively attached to the base plate; a dampening material, operatively attached between the base plate and the intermediate plate, for dampening recoil forces transmitted to the intermediate plate; and a mounting plate removably attached to the intermediate plate, the mounting plate including a camera attachment device for allowing attachment of a camera to the mounting plate; and an adjustment mechanism, operatively connected between the intermediate plate and the mounting plate, for allowing the camera to be aligned with respect to the firearm.

The camera mount further includes a firearm mounting device, operatively attached to the base plate, for mounting the camera mount to the firearm. In one embodiment, the firearm mounting device includes at least one scope mounting bracket shaped and dimensioned to allow attachment of the camera mount to a scope on the firearm. In an alternate embodiment, the firearm mounting device includes a forestock mounting bracket shaped and dimensioned to allow attachment of the camera mount to the forestock on the firearm.

Preferably, the dampening material comprises a plurality of cushioning members, wherein the cushioning members are adhesively attached in an array between the base plate and the intermediate plate, and wherein the material, size, and position of each cushioning member are selected to provide a maximum dampening effect.

In one embodiment, the camera attachment device includes a mounting hole formed into the mounting plate, where a common mounting screw can be used to attach the camera to the mounting base. In another embodiment, the camera attachment device includes one or more portions of a hook and loop fastening material adhesively attached to the mounting plate. At least one mating strip of the hook and loop fastening material is adhesively attached to the camera so that the camera can be quickly and easily installed in the field.

The adjustment mechanism may be accomplished by a wide variety of means, but is preferably constructed so that the mounting plate pivots on one end and slidably adjusts on the other end. For example, in one embodiment, the mounting plate includes a front portion and a rear portion, the front portion being pivotally connected to the intermediate plate. The rear portion is slidably and lockingly adjustable relative to the intermediate plate by a bolt and nut passed through a slot formed on either the mounting plate or the intermediate plate.

DETAILED DESCRIPTION OF THE PREFERRED EMBODIMENTS

Figure 1:
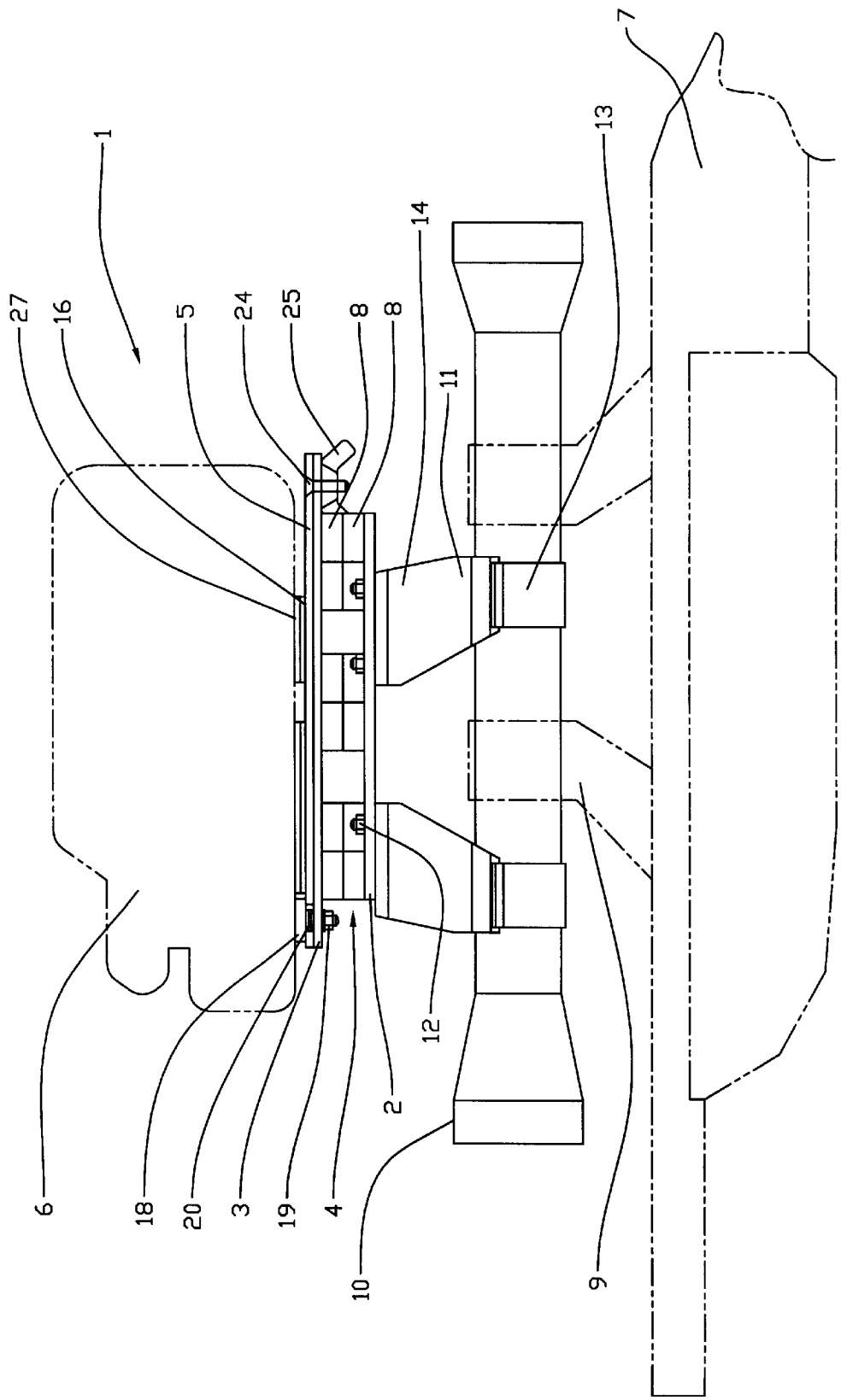
FIG. 1 is a left elevation view of one embodiment of the present invention illustrating the camera mount attached to a scope of a rifle.

While this invention is susceptible of embodiment in many different forms, there are shown in the drawings and will herein be described in detail preferred embodiments of the invention with the understanding that the present disclosure is to be considered as an exemplification of the principles of the invention and is not intended to limit the invention to the embodiments thus described and illustrated. Unless otherwise indicated herein, all materials are constructed from a durable, corrosion resistant material, such as aluminum, stainless steel, or a non-metal composite material. Preferably, for reasons of keeping the invention as light as possible, aluminum or a non-metal composite material would be preferred.

Turning now to FIG. 1, a preferred embodiment 1 of the invention is shown attached to a scope 10, which is in turn attached to a rifle 7. Scope 10 is connected to rifle 7 in the usual manner employing a first pair of scope mounting brackets 9. Camera mount 1 is shown to generally comprise a base plate 2, an intermediate plate 3, dampening means 4, and a mounting plate 5.

In FIG. 1, base plate 2 is connected to a second pair of scope mounting brackets 11 which have been inverted for use with the present invention. For example, the upper portion 14 of scope mounting brackets 11 which would normally be attached to the rifle 7 are instead connected to base plate 2 by common fastening hardware, such as a plurality of nut and bolt combinations 12. The scope attachment portions 13 of the scope mounting brackets 11 are then attached to the scope 10 in a position that is offset along the line of sight from the first pair of scope mounting brackets 9. As shown more particulary in FIGS. 2 and 3, base plate 2 is preferably attached on one side to scope mounting brackets 11 such that intermediate plate 3 and camera 6 are substantially offset from the line of sight of scope 10. Specifically, a right-handed hunter would typically require that the camera mount 1 be installed so that it will be offset to the right of the firearm 7, as shown in the figures, so that the camera mount 1 would not interfere with aiming during the hunt.

Figure 7:
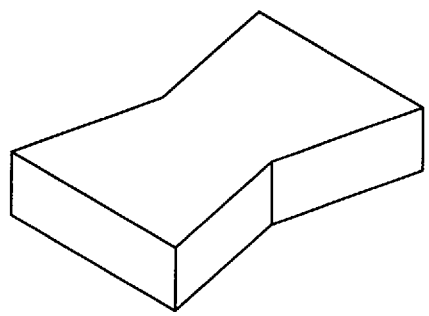
FIG. 7 is a detailed top view of a single cushioning member depicting its shape.
Figure 8:
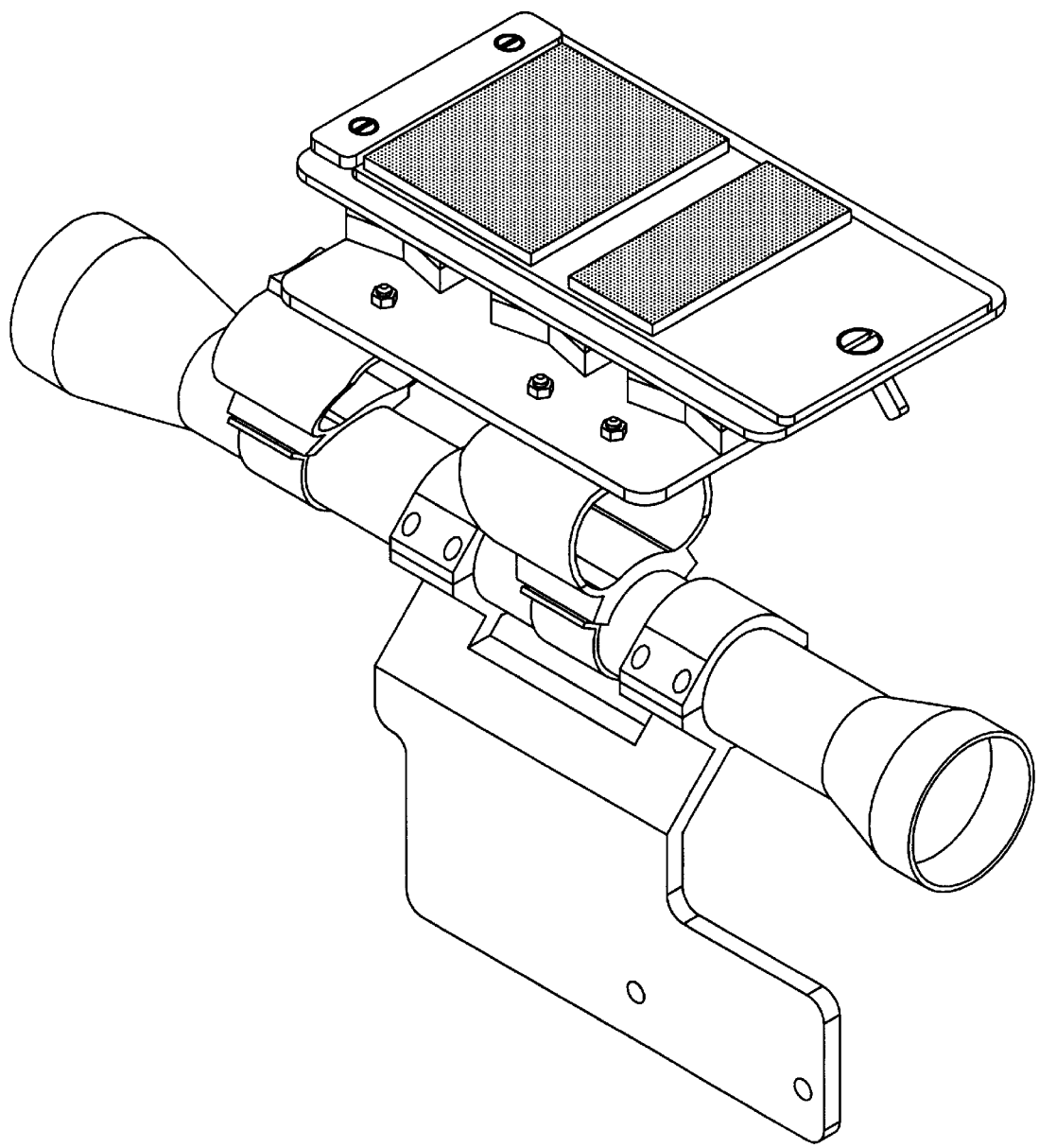
FIG. 8 is an isometric view of the invention depicting its use with the shotgun mount and an attached scope.

Intermediate plate 3 has lateral dimensions which are slightly larger than most conventional camcorders 6, and it is attached to base plate 2 by dampening means 4. Dampening means 4 is provided so that the shock of the recoil forces during shots fired from the rifle 7 will be dissipated during their transmission to the camera 6. Dampening means 4 may be virtually any material having elastic characteristics that reduce the shock of the recoil forces created by shooting firearm 7. In one embodiment shown in the figures, dampening means 4 comprises a 3×3 array of cushioning members 8 constructed of sponge rubber and adhesively attached between base plate 2 and intermediate plate 3 by a commonly available contact cement. The sponge rubber strips employed by the inventor were provided with a thickness of one quarter inch (¼"), which was not believed to provide the required dampening when used in a single layer. Therefore, two layers of cushioning members 8 are employed, and shown in FIGS. 1 and 3, by cementing the layers together using the aforementioned contact cement. Optionally, each cushioning member 8 may be shaped wherein at least two sides are curved inward toward the geometric center of the cushioning member 8, as shown in FIG. 7, in the event that greater flexion of the dampening material is desired in a lateral direction perpendicular to the line of sight of the camera 6. In any case, the material, size, shape and position of the cushioning members 8 should be selected to provide the maximum possible dampening effect for the camera 6 in order to prevent damage to the camera 6. It will be appreciated that the particular layout, size and elastic characteristics of the cushioning members 8 is not capable of precise determination due to a wide variety of factors such as camera weight, center of gravity, and the amount of recoil forces imparted by the firearm 7. However, despite these variables, any dampening effect is still desirable.

Mounting plate 5 is removably attached to intermediate plate 3 and provides the means for camera 6 to be attached to camera mount 1. Camera attachment means 15 is affixed to the upper surface of mounting plate 5, and preferably comprises at least one portion of a hook and loop fastening material 16, such as that manufactured under the trademark Velcro®, adhesively attached thereto. A mating portion 27 of the fastening material 16 is also attached to the bottom of the camera 6 so that the camera 6 can be quickly and easily mounted to the mounting plate 5 in the field. In addition to the fastening material 16, or as an alternative thereto, a mounting hole 17 is formed through mounting plate 5 so that the camera 6 may be mounted in the conventional manner using a screw (not shown) placed into an existing internally threaded hole in camera 6.

Figure 2:
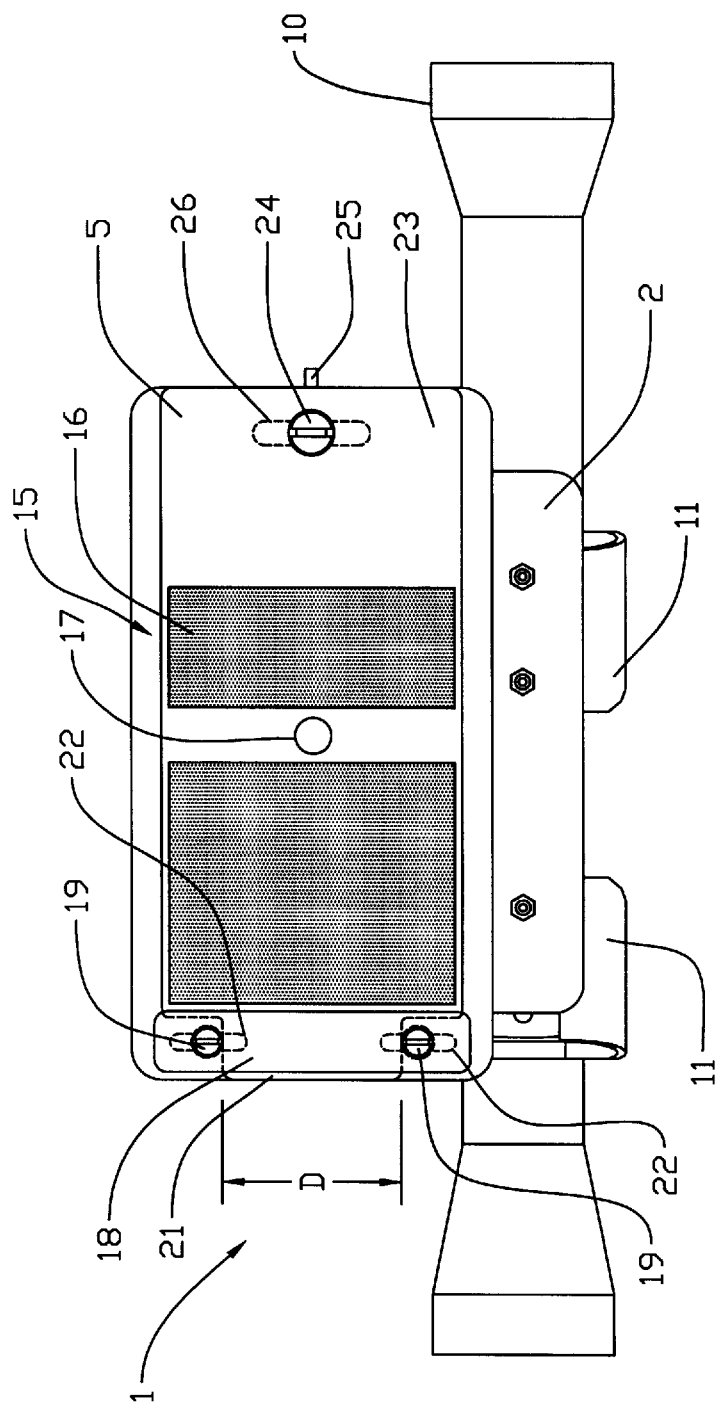
FIG. 2 is a top view of the embodiment of FIG. 1.
Figure 3:
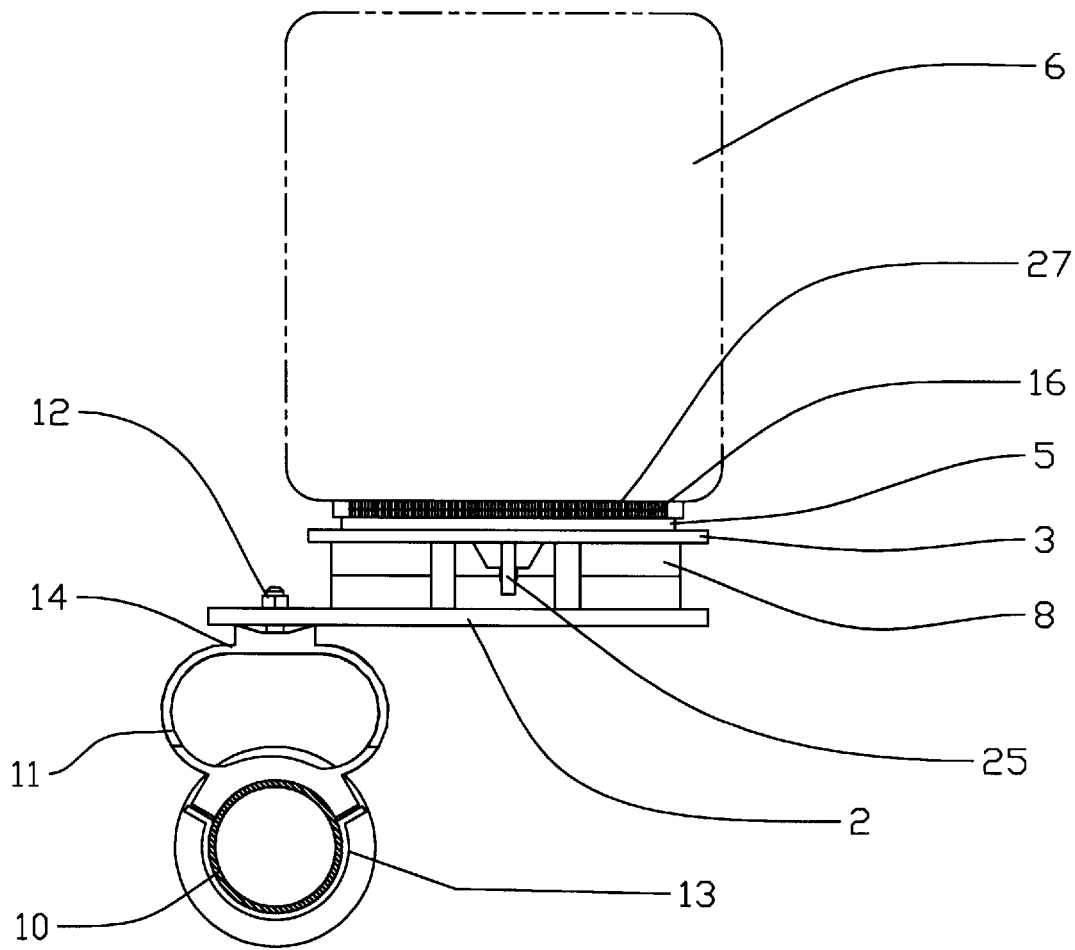
FIG. 3 is a rear elevation view of the embodiment of FIG. 1.
Figure 6:
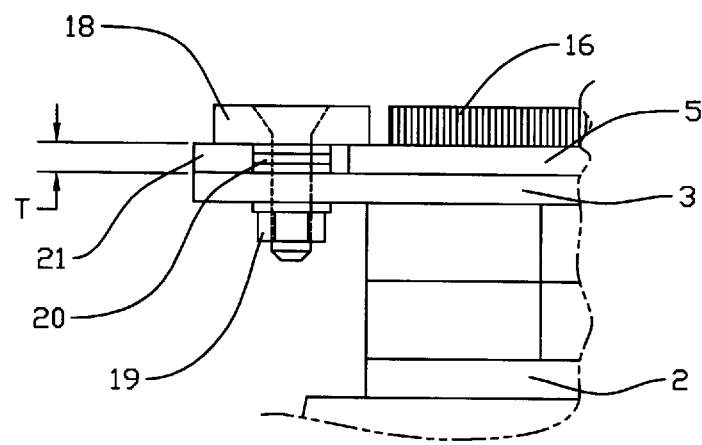
FIG. 6 is detailed elevation view of the assembly of components on the front portion of the mounting plate.

Mounting plate 5 is slidably and pivotally connected to intermediate plate 3 in the following manner in order to allow alignment of camera 6 with respect to the firearm 7. Intermediate plate 3 includes a cross member 18 affixed thereto by a pair of nut and bolt combinations 19. Cross member 18 is vertically separated from intermediate plate 3 by a thickness T through the use of spacers 20. The thickness T should be large enough, and the distance D between spacers 20 should be wide enough, to accept a mating portion 21 of mounting plate 5 as shown in FIGS. 1 and 2. A more detailed side view of the foregoing arrangement is also depicted in FIG. 6. The holes in intermediate plate 3 which accommodate the nut and bolt combinations 19 are formed as slots 22 so that the lateral position of cross member 18, and thus the lateral position of mating portion 21, can be precisely set to the desired location. The fit between mounting plate 5 and cross member 18 should not be exceptionally close, but rather such that mounting plate 5 is allowed to pivot slightly therein.

Once the lateral position of the mating portion 21 of the mounting plate 5 is determined, mounting plate 5 is attached at its rear portion 23 to intermediate plate 3 by a screw 24 and wing nut 25 passed through a slot 26 formed into intermediate plate 3. In this manner, an adjustment means is created wherein the optical line of sight of the camera 6 may be angularly adjusted with respect to the firearm 7 simply by sliding and pivoting mounting plate 5 and then tightening wing nut 25. This convenient adjustment can be made with the camera 6 mounted to the mounting plate 5, and is advantageous when the zoom level of the camera 6 is changed. Thus, if the field of view of the camera 6 is narrowed because of an increased zoom level, a small adjustment can be made to align the camera 6 with the target simply by moving the position of the screw 24 within the slot 26.

Figure 4:
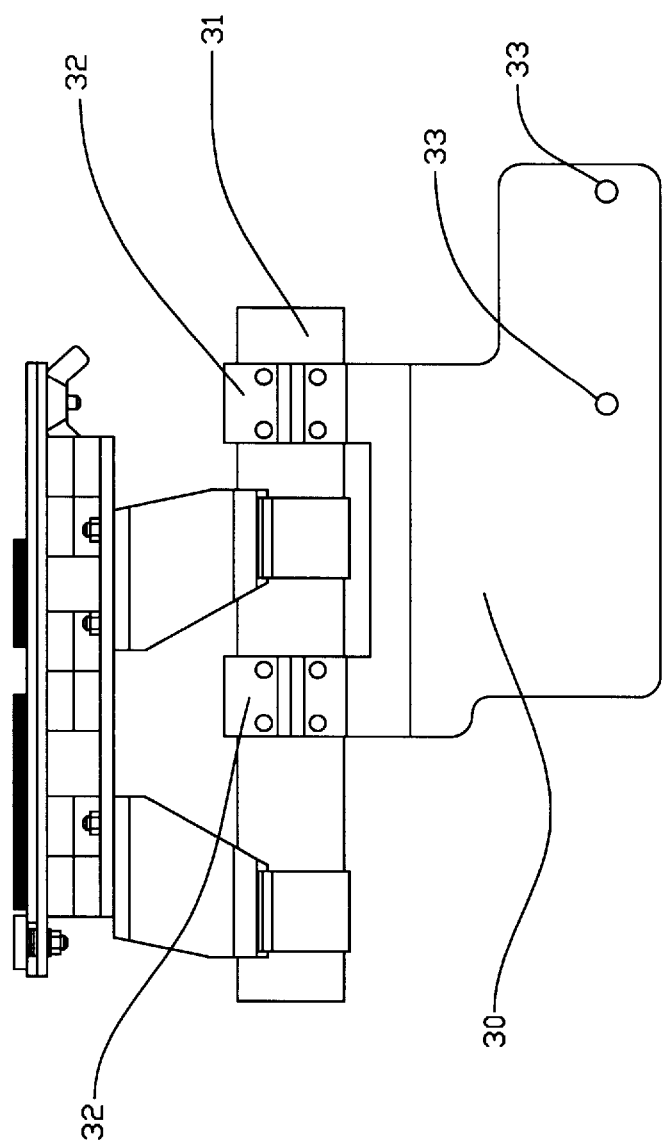
FIG. 4 is a left elevation view of an alternate embodiment of the present invention illustrating the camera mount attached to a firearm using the optional forestock mount.
Figure 5:
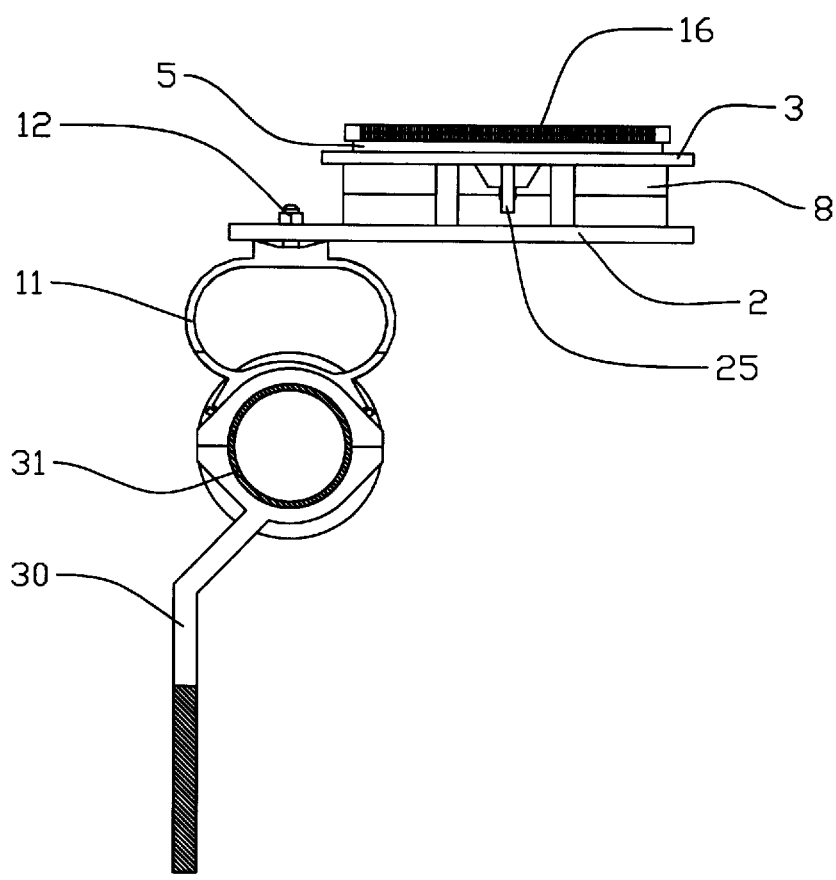
FIG. 5 is a rear elevation view of the embodiment of FIG. 4.

An alternate embodiment of the camera mount 1 is shown in FIG. 4 which employs a forestock mounting bracket 30. Rather than being mounted to the scope 10, camera mount 1 is affixed to an intermediate tube 31 having roughly the same diameter as a scope 10. Alternatively, a scope 10 can also be used, as the forestock mounting bracket 30 is available on the market and designed for use with a scope. The forestock mounting bracket 30 includes 2-piece fastening clips 32 for attachment to either the tube 31 or a scope 10, which are identical in function to the scope mounting brackets 11 explained earlier herein. The forestock mounting bracket 30 is then affixed by screws through mounting holes 33 formed through the forestock mounting bracket 30. Other than its means of attachment to the firearm, the structure and function of the camera mount 1 remains unchanged from that previously described.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A camera mount for firearms, comprising:
   (a) a base plate;
   (b) an intermediate plate operatively attached to said base plate;
   (c) dampening means, operatively attached between said base plate and said intermediate plate, for dampening recoil forces transmitted to said intermediate plate; and
   (d) a mounting plate removably attached to said intermediate plate, said mounting plate including:
      (i) camera attachment means for allowing attachment of a camera to said mounting plate; and
      (ii) adjustment means, operatively connected between said intermediate plate and said mounting plate, for allowing said camera to be aligned with respect to said firearm.

2. The camera mount according to claim 1, further including firearm mounting means, operatively attached to said base plate, for mounting said camera mount to said firearm.

3. The camera mount according to claim 2, wherein said firearm mounting means includes at least one scope mounting bracket shaped and dimensioned to allow attachment of said camera mount to a scope on said firearm.

4. The camera mount according to claim 2, wherein said firearm mounting means includes a forestock mounting bracket shaped and dimensioned to allow attachment of said camera mount to a forestock on said firearm.

5. The camera mount according to claim 1, wherein said dampening means comprises a plurality of cushioning members, said cushioning members being adhesively attached in an array between said base plate and said intermediate plate, and wherein the material, size, and position of each said cushioning member are selected to provide a maximum dampening effect.

6. The camera mount according to claim 1, wherein said camera attachment means includes a mounting hole formed into said mounting plate.

7. The camera mount according to claim 1, wherein said camera attachment means includes one or more portions of a hook and loop fastening material adhesively attached to said mounting plate.

8. The camera mount according to claim 1, wherein said mounting plate includes a front portion and a rear portion, said front portion being pivotally connected to said intermediate plate, and wherein said rear portion is slidably and lockingly adjustable relative to said intermediate plate.

* * * * *